Aug. 6, 1968    H. C. T. BOYD ET AL    3,395,817

HAND TRUCK FOR MATERIAL HANDLING

Filed Sept. 16, 1966

INVENTORS
H. C. T. BOYD
R. A. EVANS

Fetherstonhaugh & Co.
ATTORNEYS

United States Patent Office 3,395,817
Patented Aug. 6, 1968

3,395,817
HAND TRUCK FOR MATERIAL HANDLING
Harold C. T. Boyd, 88 Morgan Road, Baie d'Urfe, Quebec, Canada, and Richard A. Evans, 328 39th Ave., Lachine, Quebec, Canada
Filed Sept. 16, 1966, Ser. No. 579,933
2 Claims, (Cl. 214—370)

ABSTRACT OF THE DISCLOSURE

This invention relates to a hand truck having fork members attached to the lower portion thereof for lifting and carrying plate and sheet-like material. Each fork includes a pointed lower prong and an upper prong with a receiving throat formed therebetween. The side of each upper prong adjacent the lower prong is provided with a bead for engaging the upper surface of the material carried.

---

The present invention relates to material handling equipment and, particularly, to a hand operated truck for moving heavy plates of steel or other material from one location to another in a quick and easily executed manner.

The preferred object of the invention is to prvoide a hand operated truck useful in the moving and positioning of heavy steel dock plates which are usually about ⅝" thick and weighing up to 500 pounds. Such plates are necessary during the loading and unloading of railway freight cars and span the gap between the floor of the freight car and loading dock. Once the dock plates are in position the freight is then loaded or unloaded from the car by man power, carts, hand trucks, or fork-lift trucks, and the weight of the loaded freight handling equipment and the length of span requires that these dock plates be very strong and consequently very heavy.

When railway express cars are loaded (or unloaded), and ready to be moved away from the loading dock, the dock boards have in the past been moved by fork-lift trucks since they are too heavy to be man handled. This operation, when performed on a large number of cars in a line, is very time consuming, as it is not economically feasible to keep a number of fork-lift trucks around for this purpose alone. When only a few fork-lift trucks can be made available for the removal of dock boards, the time available for loading is much decreased because of the amount of time needed to remove them.

The use of the hand operated truck according to the present invention reduces the time necessary for placing and removing the dock plates. This reduction in time is achieved because the cost of the invention makes it economically feasible to supply one hand truck for each two or three freight cars, and thus the time required for moving the dock plates is reduced from that of one forklift truck working on ten or more cars, to that of one hand truck working on two or three freight cars.

The main object of the present invention is the provision of an economically produced hand truck for moving heavy dock plates.

It is another object to provide a hand truck of rugged and functional design, for moving heavy steel dock plates from one position to another in a quick and easily executed manner.

It is still a further object to provide a hand operated truck for moving steel dock plates needed in the loading and unloading of freight cars from one position to another, obviating the use of fork-lift trucks usually employed for this purpose.

It is still another object to provide a hand operated truck for lifting and conveying plate or sheet-like material, comprising two substantially parallel handle members having lower and upper ends, an axle carried by the handles at the lower ends thereof and two ground engaging wheels carried by the axle, and a plate engaging fork fixedly attached to each handle at the lower end thereof, each plate engaging fork consisting of a pointed lower prong projecting from the handle at an acute angle to the axis thereof, and an upper prong positioned a distance above the lower prong and substantially parallel therewith, said upper and lower prongs forming therebetween a plate receiving throat.

While the principal purpose of the present hand operated truck is for the moving of heavy steel plates from one position to another, it will be apparent that the hand truck will be equally useful for moving other plate-like or sheetlike material, such as plywood.

The above objects and others will be apparent from the following description taken in conjunction with the accompanying drawings wherein.

Figure 1:
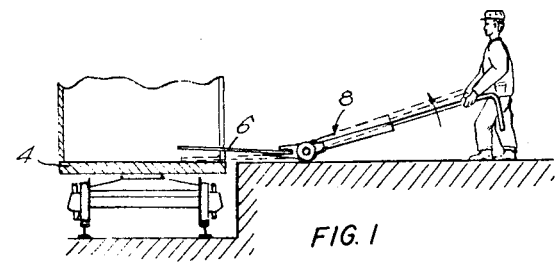
FIG. 1 illustrates the use of the hand operated truck according to the present invention, and is shown placing a steel dock plate between a loading dock and the floor of a freight car.

In FIG. 1 a loading dock is shown at 2 and a railway freight car at 4. When loading or unloading the freight car, it is necessary to bridge the gap between the dock and the floor of the car with dock plates which are strong and are usually made of steel. One of these plates is shown at 6 being placed in position by a workman using a hand truck, indicated generally at 8, of the present invention.

Figure 2:
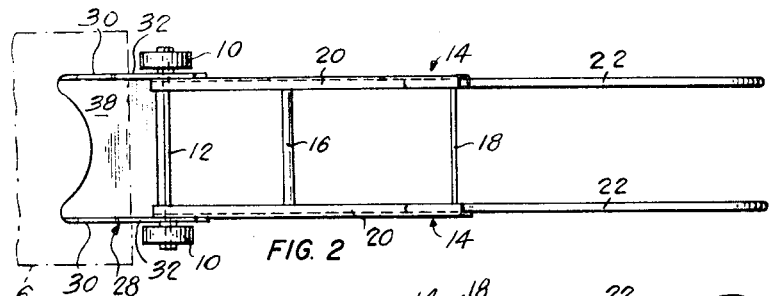
FIG. 2 illustrates the hand truck in top view.
Figure 3:
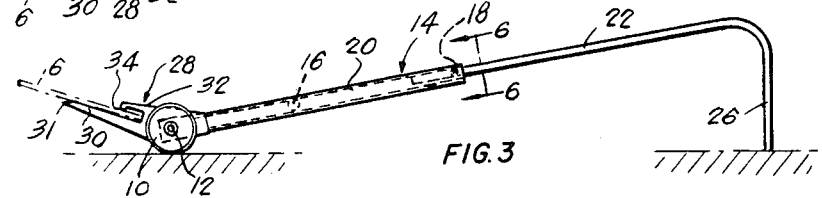
FIG. 3 illustrates the hand truck in side view.
Figure 4:
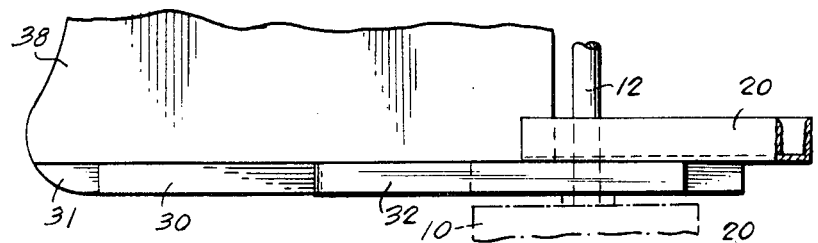
FIG. 4 illustrates in top view an enlarged partial view of the hand truck.
Figure 5:
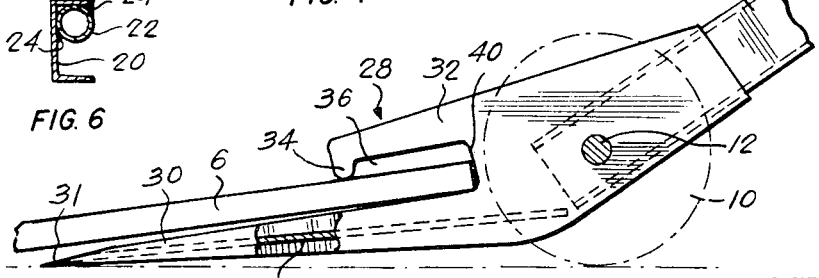
FIG. 5 illustrates in side view an enlarged partial view of the hand truck.

The hand truck is shown more clearly in top view in FIG. 2, and in side view in FIG. 3, with enlarged segments of each view being shown in FIGS. 4 and 5 respectively.

Figure 6:
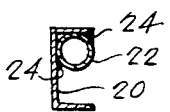
FIG. 6 is a cross-sectional view of one of the handles of the hand truck taken along line 6—6 of FIG. 3.

The hand truck consists of two ground-engaging wheels 10, preferably of steel for durability, rotatably mounted on an axle or shaft 12. The parallel handles 14, secured together by cross-braces 16 and 18, carry the axle 12. In the drawings the lowermost section 20 of each handle is made of steel channel for strength, whereas the uppermost section 22 of each handle is constructed from piping. The two handle sections 20 and 22 may be connected together by welding, as shown at 24 in FIG. 6. This handle form is of course only one specific design, and other handle designs can be used without departing from the scope of the invention.

The upper ends of handles 14 may be curved downwardly as shown at 26 in FIG. 3, for the dual purpose of ease in picking up the handles, and to ensure that the hand truck does not lie directly on the floor where it would be vulnerable to damage by passing vehicles, etc.

Securely affixed as by welding (not shown) to the lower ends of each handle is a plate engaging fork indicated generally by 28. Each plate engaging fork consists of a lower prong or tyne 30, pointed at its projecting end 31. The prong 30 projects away from the handle at an acute angle to the axis thereof. The end 31 of the prong 30 is pointed to facilitate insertion beneath a plate to be lifted and moved. Each plate engaging member also consists of an upper prong 32 positioned a distance above and substantially parallel with the lower prong 30. The upper prong 32 extends only partially along the length of the lower pointed prong 30, and may be provided with a bead 34 on its side adjacent the lower prong for contact with the upper surface of a plate 6. The lower pointed prong 30 and the upper prong 32 form therebetween a dock plate receiving throat 36. (See FIG. 5.)

In the drawings the two plate engaging forks 28 are shown connected by a steel plate or webbing member 38 for purposes of rigidity but this member could be omitted without impairing the efficiency of the truck.

To raise and move a dock plate the operator of the truck raises the handles 14 until the pointed tips 31 of the prongs 30 are close to or touching the ground. The truck is then pushed up to the edge of the dock plate and the prongs 30 are pushed under the plate until the edge of the plate contacts the end 40 of throat 36. See FIG. 5. This operation is easily carried out by forcing one prong 30 after another under the board with an oscillating motion. Moreover, the operator may give the truck a push with his foot on the lower cross bar or brace 16.

When the edge of the plate has been completely inserted into the throats 36, the operator applies downward pressure to the uppermost ends of handles 14 to raise the plate by its edge. The plate can then be wheeled in the same way as an ordinary hand truck to a new location, where it can be set down by the reverse operation.

The lifting action takes place by leverage applied to the plate by the rounded bead 34 on the upper prong and the pointed tip 31 of prong 30.

The above operations of picking up and setting down a dock plate can be performed whether the plate is flat on the dock, or at an angle to the dock as caused by the car floor being higher or lower than the dock.

What we claim is:

1. A hand operated truck for lifting and carrying plate or sheet-like material, comprising two substantially parallel handle members having lower and upper ends, an axle carried by the handles at the lower end thereof and two ground engaging wheels carried by the axle, and a plate engaging fork fixedly attached to each handle at the lower end thereof, each plate engaging fork consisting of a pointed lower prong projecting from the handle at an acute angle to the axis thereof, and an upper prong positioned a distance above the lower prong and substantially parallel therewith, the side of the upper prong adjacent the lower pointed prong having a bead thereon for contact with the upper surface of the plate, the said upper and lower prongs forming therebetween a plate receiving throat.

2. A truck according to claim 1 in which the upper prong is substantially shorter than the lower prong and the said beads are located at the free end of the upper prongs to form restricted throat entries to limit the movement of the plate within the plate receiving throat.

References Cited

UNITED STATES PATENTS

| | | | |
|---|---|---|---|
| 1,814,309 | 7/1931 | Gullborg | 280—47.27 |
| 2,389,294 | 11/1945 | Burke | 280—47.27 X |
| 2,433,754 | 12/1947 | Belko | 214—384 |
| 3,257,018 | 6/1966 | Miles | 214—370 |
| 3,275,175 | 9/1966 | Arnold | 214—384 X |

BENJAMIN HERSH, *Primary Examiner.*

J. A. PEKAR, *Assistant Examiner.*